T. B. HUGHES, W. J. DAVIS AND D. D. HUGHES.
COLD ROLL FEEDER MECHANISM.
APPLICATION FILED AUG. 13, 1914. RENEWED NOV. 21, 1918.
1,304,050.
Patented May 20, 1919.
6 SHEETS—SHEET 1.
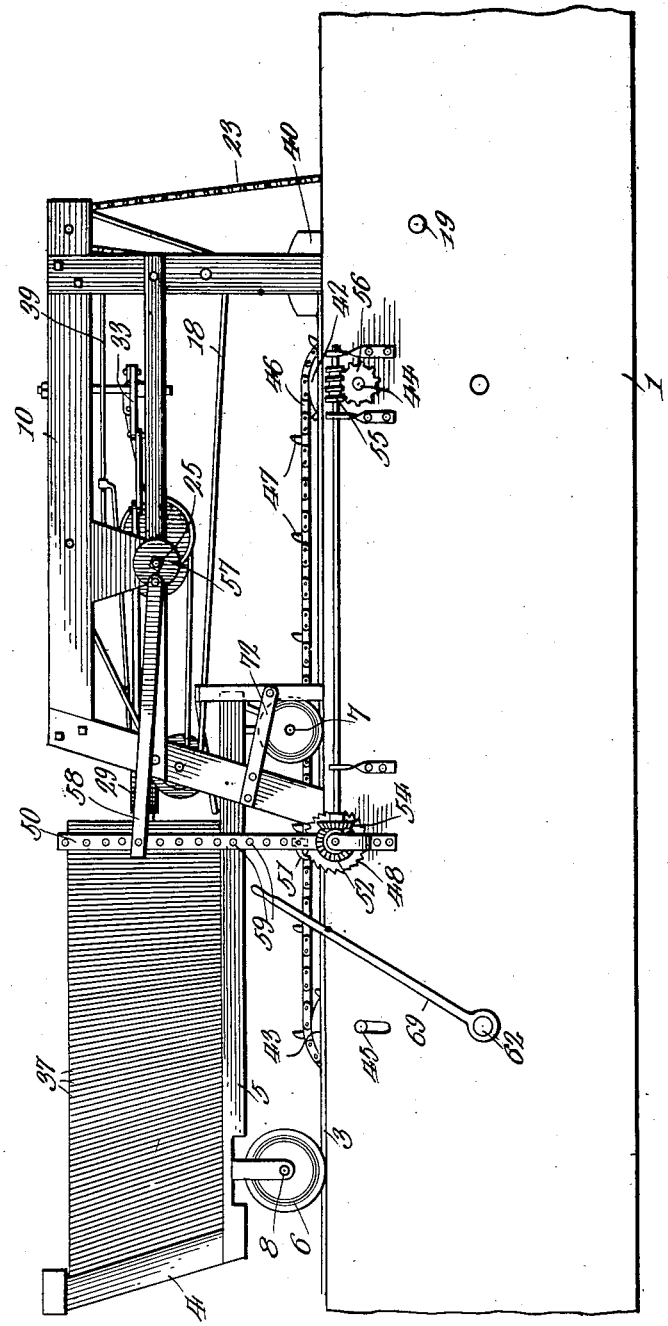
Witnesses
Guy M. Spring.
Lloyd W. Patch
Inventor
Thomas B. Hughes.
William J. Davis.
David D. Hughes
By Richard B. Owen,
Attorney

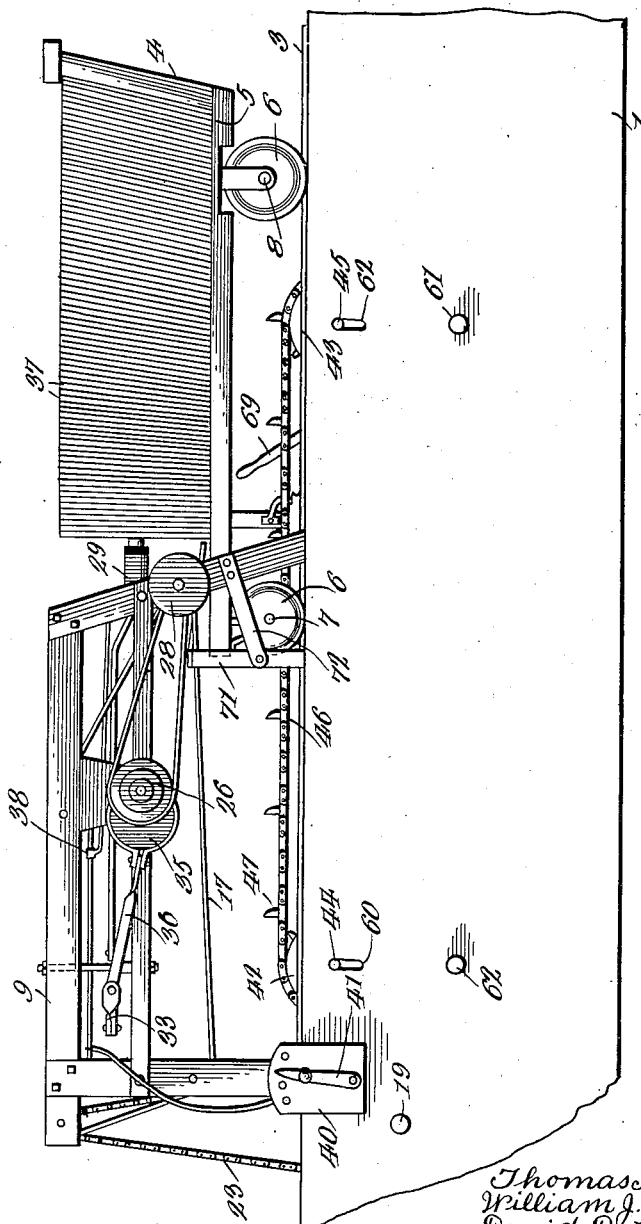

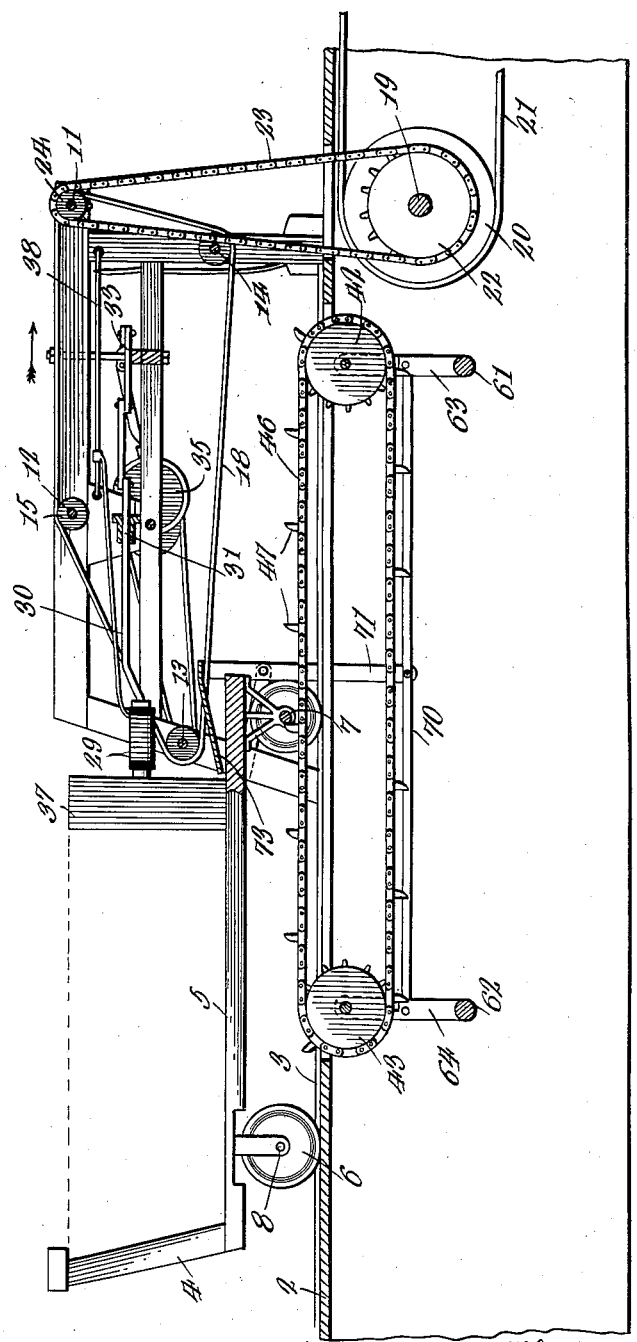

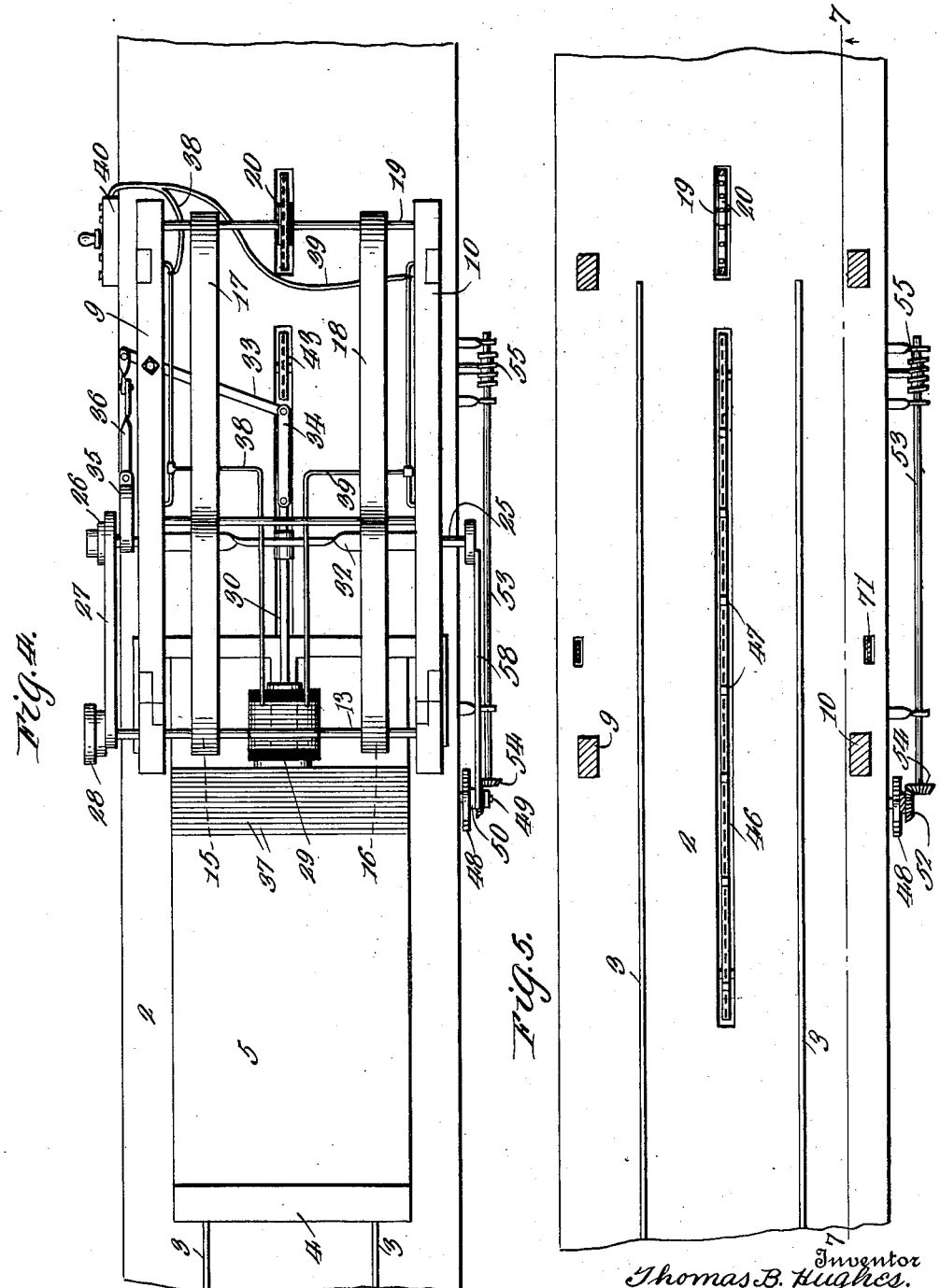

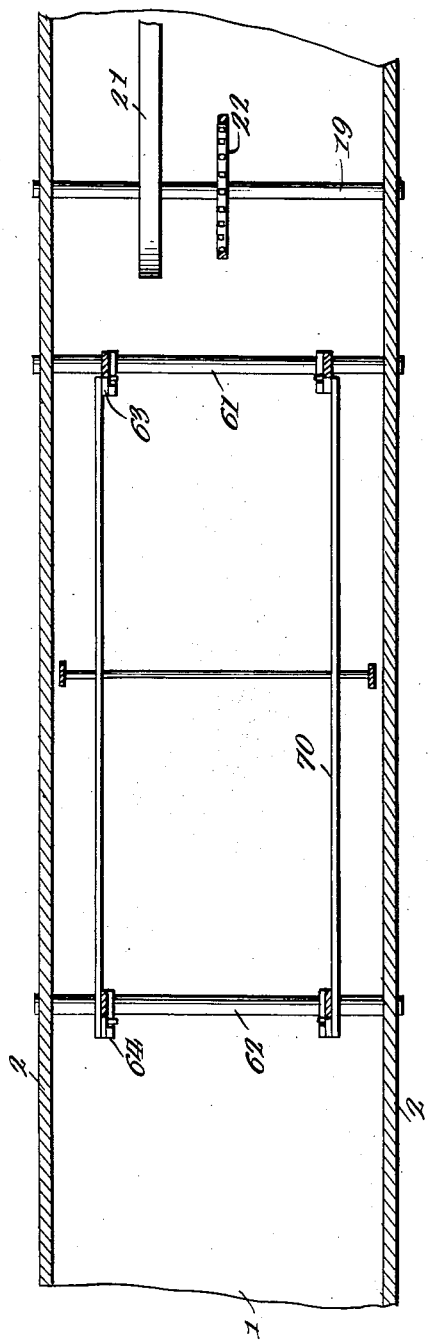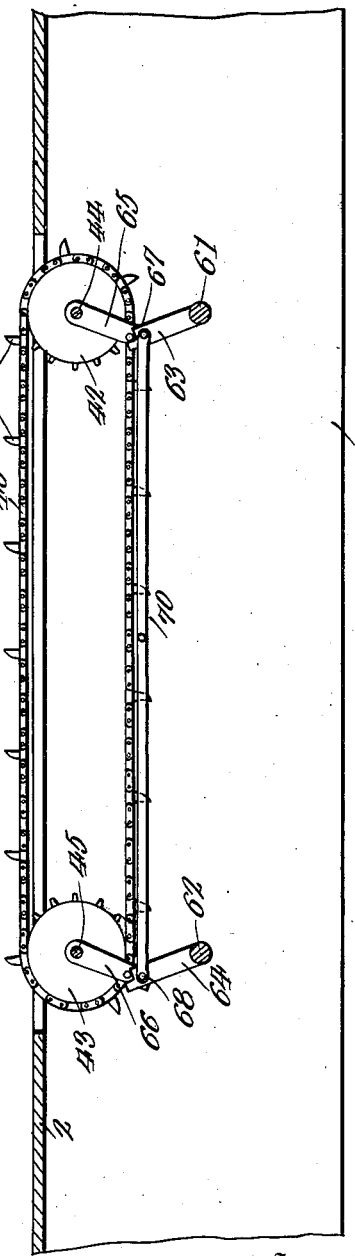

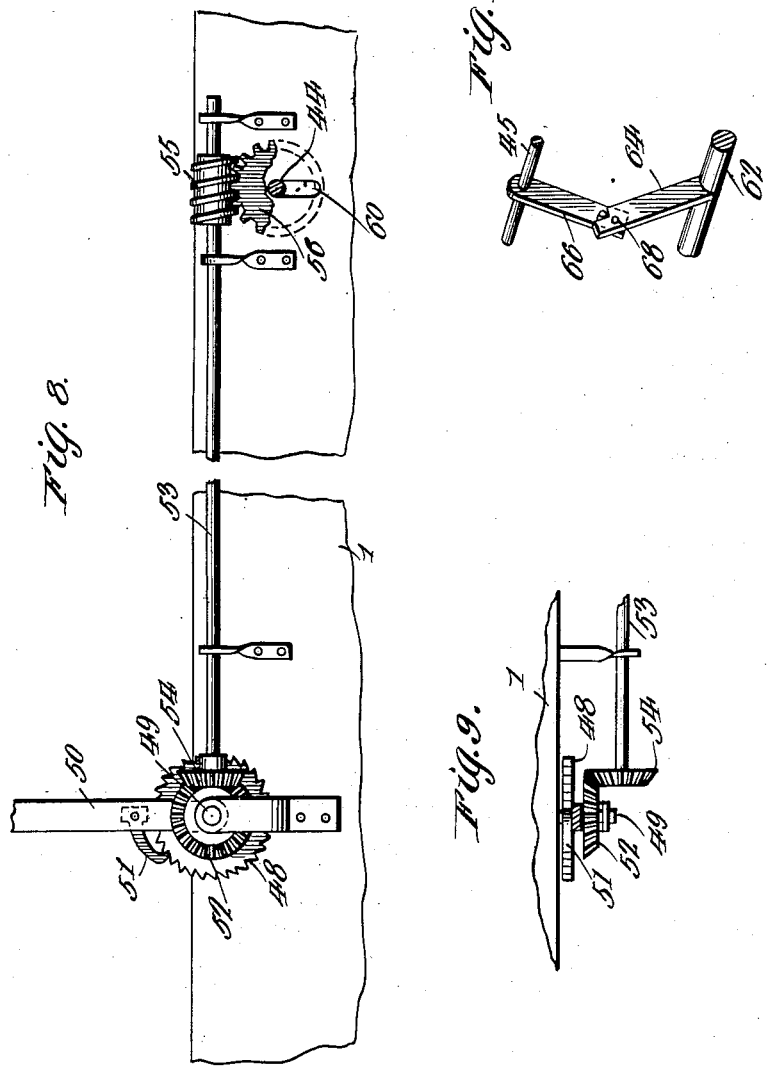

UNITED STATES PATENT OFFICE.

THOMAS B. HUGHES, WILLIAM J. DAVIS, AND DAVID D. HUGHES, OF GRANITE CITY, ILLINOIS.

COLD-ROLL-FEEDER MECHANISM.

1,304,050.  Specification of Letters Patent.  Patented May 20, 1919.

Application filed August 13, 1914, Serial No. 856,695. Renewed November 21, 1918. Serial No. 263,633.

*To all whom it may concern:*

Be it known that we, THOMAS B. HUGHES, WILLIAM J. DAVIS, and DAVID D. HUGHES, citizens of the United States, residing at Granite City, in the county of Madison and State of Illinois, have invented certain new and useful Improvements in Cold-Roll-Feeder Mechanism, of which the following is a specification.

An object of our invention is to provide a mechanism by which tin plates or like plates to be operated upon may be fed to a cold roll or other working mechanism without manual handling.

A further object is to so construct the parts of the mechanism that the plates will be taken one at a time from a plurality of plates and will be carried to the receiving mechanism of a working machine.

Yet another object is to provide means by which the plates to be fed by this mechanism are held and which are constantly maintained in a position to accomplish the most efficient feeding action.

A still further object is to construct the mechanism in such a maner and to so connect the parts thereof that the operation is entirely mechanical and may be maintained continuously, but is yet at all times within the control of the operator and may be given various settings to accommodate various operating conditions.

With other objects in view, which will be referred to, our invention consists in the peculiar combination and novel arrangement of parts, such as will be hereinafter more fully described in connection with the accompanying drawings and more particularly pointed out in the appended claims.

In the drawings:—

Figure 1 is a view in side elevation of the mechanism of our invention taken from one side thereof.

Fig. 2 is a view similar to Fig. 1 but taken from a point to disclose the opposite side of the machine.

Fig. 3 is a longitudinal vertical sectional view through the disclosure in Fig. 1.

Fig. 4 illustrates in top plan the mechanism in the arrangement illustrated in Fig. 1.

Fig. 5 is a view in top plan of the base member of the mechanism with parts of the structure removed more clearly to illustrate certain features of the invention.

Fig. 6 is a horizontal sectional view taken transversely through the base structure of the mechanism.

Fig. 7 is a longitudinal vertical sectional view taken on the line 7—7 of Fig. 5 and looking in the direction indicated by the arrow.

Fig. 8 is a fragmentary detail in side elevation of certain of the operating mechanism to maintain the plate carrier in the proper position to attain the most efficient operation.

Fig. 9 is a view in top elevation of the mechanism disclosed on the left-hand end of the showing in Fig. 8.

Fig. 10 is a fragmentary detail view in perspective of certain of the operating parts.

The mechanism comprises the base member 1 which preferably comprises the two sides and the top 2 secured together to form a hollow structure, and the tracks 3, 3 are mounted on this top member 2 to extend parallel with the side members of the base structure. A car 4 has the floor 5 thereof made comparatively low and the supporting wheels 6 of the cars are mounted on the front and rear axles 7 and 8, respectively, and are fitted to the track 3 so that the car may be mounted and guided on these tracks in its course of travel along the extent of the base member 1.

The frame members 9 and 10 comprising uprights and cross-bars are mounted on the top 2 of the base member 1 to extend parallel with the disposition of the track 3 and are spaced sufficiently far apart that the car 4 is permitted to have movement therebetween in its path of travel along the track 3. The shafts 11, 12, 13 and 14 are journaled on the uprights and connecting bars of the frame members to extend transversely therebetween and to be each in a plane above the floor 5 of the car 4. These several transversely mounted shafts have the rolls 15 and 16 carried thereby at points spaced apart near each end and the belts or conveying webs 17 and 18 are mounted to travel over these rolls 15 and 16, respectively, and to have movement in the direction indicated by the arrow in Fig. 3. A drive shaft 19 is mounted to extend transversely of the base member 1 and connected on this drive shaft is the drive pulley 20 which has a belt 21 passed thereover and extended to any suitable source of motive power which will cause revoluble movement to be transmitted to the drive shaft 19. A sprocket 22 is secured on the drive shaft 19 to be revolved therewith and a sprocket chain 23 is connected over the sprocket wheel and over the sprocket gear 24 which is mounted on the shaft 11 and thus the movement given by the power means to the drive shaft 19 is transmitted to this shaft 11 and the conveying webs 17 and 18 are carried in the direction indicated over the several rolls 15 and 16 disposed on the transversely mounted shaft.

An operating shaft 25 is mounted between the frame members 9 and 10 to be capable of rotary movement and to extend in the same general direction as the several shafts hereinbefore positioned, and this shaft 25 has a stepped pulley 26 mounted on the one end thereof and a belt 27 is passed over this stepped pulley 26 and over a stepped pulley 28 which is secured on one end of the shaft 13 to transmit movement therefrom to the shaft 25 as driving motion is transmitted from the power connection to the shaft 11 and the web conveyer belts 17 and 18 are actuated, and these stepped pulleys 26 and 28 are arranged to have the steps tapered in opposite directions so that the speed of rotation of the shaft 25 may be either increased or decreased with respect to the speed of travel of the shaft 13 to meet various conditions of operation. A magnet 29 of the electro-magnetic coil type is secured on a slide rod 30 and this slide rod is mounted in a bearing 31 provided on a cross member 32 secured between the frame members 9 and 10. A rocking lever 33 is pivotally mounted on the frame member 9 and the one free end thereof is connected by a link 34 with the slide rod 30 by which the magnet 29 is carried, an eccentric 35 being secured on the shaft 25 and connected by a link 36 with the opposite free end of the rocking lever 33 so that upon rotation of this shaft 25 and consequent actuation of the eccentric to move the link 36 in a reciprocatory path, a rocking movement is transmitted to these pivotally mounted levers 33 and through the connection of the lever 34 with the slide rod 30, the reciprocatory movement is transmitted to the electro-magnet 29. The bearing 31 is so placed and the slide rod 30 so mounted therein that this reciprocatory movement of the magnet 29 is at a point between the conveyer webs 17 and 18 and it is the intention that the tin plates shall be placed as indicated at 37 upon the floor 5 of the car 4 and that the forward movement of the magnet shall bring this magnet into contact with the foremost plate carried by the car and then upon the rearward movement of the magnet in its reciprocatory path, the plate will be carried against the conveyer webs 17 and 18 and the continued movement of the magnet will cause an angular pressure upon the plate to break the electrical attraction and to cause a depositing of the plate upon the webs by which it is carried to the proper point and is fed to the rolling or other working machine. The circuit connection to the coils of the electro-magnet 29 is through the circuit wires 38 and 39, which circuit wires are so arranged that the reciprocatory movement of the magnet is permitted, and a controller 40 is connected in this circuit to the magnet at a point that the controller handle 41 is readily accessible to the operator and thus the parts are so constructed that variations may be made in the power of attraction of the magnet to accommodate the mechanism to operate upon various qualities of metal and also for various thickness and weight of plates.

To maintain the car 4 always at a position at which the magnet 29 will, on its forward stroke, contact with and take from the car one of the plates, it is essential that some means be provided to move the car along the track 3 a predetermined distance with each complete reciprocatory movement of the magnet 29 and consequently this movement must be judged by the rotation of the shaft 25. To accomplish the object as above set forth, we provide the sprocket wheels 42 and 43 which are mounted on the shafts 44 and 45, respectively, to have the sprocket chain 46 work on the sprockets thereof. The sprocket chain 46 has a plurality of spaced lugs 47 mounted to project from the outer face thereof and when the parts are in the position indicated in the several views, and motion is transmitted to this sprocket chain 46, one of these projecting lugs will engage with the axle 7 upon which the forward wheel 6 of the car 4 are mounted, however, it is desired that only a step-by-step movement be transmitted to this sprocket chain and that in this way the car be moved forward a distance equal to the thickness of one of the plates upon each reciprocatory movement of the magnet.

A ratchet wheel 48 is mounted upon the shaft 49 to have revoluble movement and an arm 50 is pivoted on the shaft 49 to be capable of swinging movement with respect to the ratchet wheel 48 and is provided with a ratchet dog 51 positioned thereon to engage with the teeth of the ratchet wheel. A bevel gear 52 is secured on the shaft 49 to be revolved as movement is transmitted to the ratchet wheel by the swinging of the lever 50 and the engagement of the dog 51 with the teeth of the ratchet wheel as this lever is swung. A shaft 53 is mounted to extend at right angles to the disposition of the shaft 49 and a bevel gear 54 is secured thereon to mesh with the bevel gear 52. The shaft 53 is carried to a position adjacent the mounting of the shaft 44 and a worm 55 secured on the shaft 53 meshes with a worm wheel 56 secured on the shaft 44 thus insuring that the turning movement of the ratchet wheel 48 will be transmitted to the shaft 44 to cause a carrying movement of the sprocket chain 46. An eccentric 57, as better disclosed in Fig. 1, is secured on one end of the shaft 25 and a connecting link 58 is mounted on the eccentric and is extended to connect with the pivoted operating lever 50, this operating lever 50 being provided with a plurality of openings 59 to permit an adjustment of the connection of the link 58 therewith and to consequently regulate the extent of the swinging movement transmitted to the lever to vary the distance which the ratchet wheel 48 will be carried forward by the engagement of the dog 51 therewith.

In some instances it will be found desirable to connect the belt 21 to receive its driving power from the rolling or other working machine and in this connection, also in other instances of adaptation of this invention it may be found desirable to stop the operation of the mechanism of this invention and to yet permit an operation of the parts by which the belt 21 is given movement, and for this purpose mechanism is provided to permit a shifting of the sprocket chain 46 and the parts by which this sprocket chain is carried to a position that the projection 47 will be sufficiently beneath the axle 7 that engagement of the projection therewith is precluded. The bearings 60 in which the shafts 44 and 45 are journaled, as better illustrated in Fig. 8, are elongated in a vertical direction to permit a vertical shifting of the shafts and as the sprocket wheels 42 and 43 are secured on these shafts, the shifting of the shafts 44 and 45 in a downward direction will cause the sprocket chain 46 to be dropped to a position that these projections 47 thereof are out of operative relation, and further as the teeth of the worm gear 56 are disengaged from the worm threads of the worm 55, rotary motion of the shaft and consequent movement of the chain 46 is stopped. The shafts 61 and 62 are mounted in the base member 1 at points preferably vertically beneath the mounting of the shafts 44 and 45 and these shafts 61 and 62 have the arms 63 and 64 formed to project therefrom. The links 65 and 66 are pivotally mounted on the shafts 44 and 45 and a pivotal connection is formed at 67 between the links 65 and the arm 63 and at 68 between the arm 64 and the link 66, thus as turning movement is transmitted to the shafts 61 and 62, the pivotal or knuckle connection between the same and the links causes the shafts 44 and 45 to be moved in an upward direction through the bearings 60 and the parts will then be brought to the position indicated in the several views of the drawings where the lug 47 will engage with the front axle 7 of the carriage and this carriage or car 4 will be moved to accommodate the operating conditions. The shaft 62 has a hand lever 69 connected therewith to permit manual turning of this shaft in an operative direction and links 70 are connected between the free ends of the arms 63 so that movement transmitted to the shaft 62 by the hand lever 69 is carried to the shaft 61 and the same relative movement is given to both the shaft 44 and the shaft 45.

A safety lever 71 is pivoted near its center on a bracket 72 carried by the frame member 10, this safety lever being provided at its upper end with the arm 73 and at its lower free end connected with the link 70 so that movement of the hand lever 69 causes a swinging and adjusting of this safety lever 71 toward the car 4.

The handle 69 may be held by its own weight or by other well known means, so as to hold the parts that are supported by the shafts 61 and 62 in their raised or operative position. The lever 71, being pivotally connected to the link 70, is also held in operative position by the lever 69, so that the arm or packer 73 serves as a stop for the bottom edges of the sheets or plates.

The operation of the mechanism is as follows, the parts by which the sprocket chain 46 are carried are lowered to a point that the projections 47 are in a lower plane than the axle 7 and the car may then be moved to a position entirely beyond the area embraced by the frame members 9 and 10. With the parts in this relation, the plates will then be loaded on through the car to stand with their edges on the floor 5 as is illustrated in the several figures of the drawings, driving motion is given to the drive pulley 20 through the belt 21 and this causes an actuation of the several parts of the mechanism, the car 4 is then moved inwardly by means (not shown) independent of the chain 46 and the hand lever 69 is shifted to bring the sprocket chain 46 to a position that one of the projections 47 thereof will move into engagement with the front axle 7 of the car 4 and through the turning movement transmitted by the ratchet wheel 48, a forward propulsion of the car 4 will be accomplished. The shifting of the lever 69 causes the packer 73 to pack the bottom edges of the sheets together, for causing them to stand approximately erect on said edge, thereby preventing them from sliding under the magnet and conveyer webs or belts 17 and 18. This also positions the sheets so that their respective armatures or areas of magnetic contact are approximately parallel with the vertical contact surface of the magnet. When the car has received a sufficient forward movement that the magnet 29 engages with the last plate placed thereon, this plate will be attracted to the magnet and will be carried laterally of all of its edges to and deposited on the webs 17 and 18 as hereinbefore set forth, then the movement of these conveyer webs will cause the plates to be carried as is indicated by the arrow in Fig. 3, and from the upper horizontal extent of the conveyer webs 17 and 18 the plates may be fed to any working mechanism as a rolling machine. The same operation which has caused the magnet 29 to be moved in a rearward direction is also transmitted to the eccentric 57 and through the arm 58 to the pivoted lever 50 which through the engagement of the dog 51 with the ratchet teeth of the ratchet wheel 48 causes a turning movement to be transmitted to the connecting mechanism to the worm gear 56 carried by the shaft 44 and in consequence a forward movement is transmitted to the sprocket chain 46 to cause the car 4 to be moved forward the distance equal to the thickness of the plate which has been taken therefrom by the magnet, and, upon the next forward reciprocatory movement of the magnet, the next plate in line is engaged thereby and is held by the magnetic attraction and is carried as before described and deposited upon the conveyer webs 17 and 18 from which it is fed to the working mechanism.

The movements of each sheet, from the car to and along the conveyer or webs 17 and 18, is as follows: After a sheet has been taken from the stack or pack, a slight space is left between the next adjacent sheet and the packer 73, as shown in Fig. 1; and when the car moves the next step, the lower edge of the next sheet to be conveyed is stopped by the packer 73, so that when the sheet is engaged by the magnet, its upper edge swings sidewise of the sheet until the conveyer engages the sheet, carries it edgewise and elevates it to the horizontal part of the conveyer, which latter continues to carry the sheet edgewise, but in a horizontal direction. If the sheets should be moved in the pack, so as to close the gap at the end of the packer, the latter would automatically pack the sheets during the next step of the car in its feeding operation.

The vertical distance across the face of the magnet 29 is relatively small as compared with the horizontal distance thereof, so that the contact of the sheet with the lower edge of the magnet is easily broken while its upper edge adheres to the sheet until the latter has been forced, by the conveyer, out of engagement with the magnet.

The belt 27 may be shifted from one step to another of each of the pulleys 26 and 28, so as to vary the speed of the magnet-carrying or plate-feeding mechanism relative to the speed of the conveyer; thereby providing for maximum economy and efficiency in handling sheets of different widths, measured from the car floor up.

The electric conductors, one of which is indicated at 39 in Fig. 1, may be guide rods on which the conductor wires or reciprocatory connectors 38, Fig. 4, may slide; said connectors being provided with sleeves 38', Fig. 2, that are slidable along the guide rods and maintain a continually closed circuit.

From the foregoing it will be seen that we have provided a mechanism by which tin plates or plates of any other electro-magnetically attracted metal may be fed to a working mechanism without manual handling, and further that the plates are taken one by one from a common carrier and each is operated upon separately and is fed at just the proper points, further it is evident that the machine is automatic in its operation, each part being accomplished by a mechanical movement and the several parts thereof may be regulated and adjusted to accommodate varying operating conditions.

While we have herein shown and described one specific form of our invention, it will be understood that slight changes might be made in the form and arrangement of the several parts of the mechanism without departing from the spirit and scope of our invention, and hence we do not wish to be limited thereto except for such limitations as the claims may import.

We claim:—

1. A feeder mechanism comprising a car adapted to receive and hold a plurality of plates, means to take the plates singly from the car, a sprocket chain to be capable of movement adjacent one of the axles of said car, projections provided from said sprocket chain to engage with said axle, and means to be operated during the operation of the means to take the plates from the car to cause movement of the sprocket chain to carry the car forward step by step.

2. A feeder mechanism comprising a base member, a supporting frame mounted on the base member, a conveyer carried by the supporting frame, a car adapted to receive and hold a plurality of plates, a track supported by the base member on which the car is mounted, means to transmit an operative motion to said conveyer, means to take the plates from the car and deposit these plates on the conveyer, means connected from said operating shaft to the means by which the plates are taken to cause an actuation thereof, and means to be also operated by the turning of this shaft to cause a forward propulsion of the car as each plate is taken.

3. A feeder mechanism comprising a base member, a supporting frame mounted on said base member, a conveyer carried by the supporting frame, a car adapted to receive and hold a plurality of plates and mounted to be capable of endwise movement on said base member adjacent the supporting frame, means to transmit an operative movement to said conveyer, means carried by the supporting frame to take the plates singly from the car and deposit these plates upon the conveyer, a sprocket chain mounted on sprocket wheels carried by the base member, projections provided on the sprocket chain to engage with a portion of said car, and means connected to be actuated by the operation of the conveyer to cause a forward propulsion of the car in a step-by-step path as each plate is taken from this car.

4. A feeder mechanism comprising a base member, a supporting frame mounted on said base member, a car adapted to receive and hold a plurality of plates, a track mounted on said base member, wheels carried by the car to travel on said track, a conveyer carried by the supporting frame by which the plates are transferred to the desired point, sprocket wheels carried by the base member, a sprocket chain mounted on said sprocket wheels, a plurality of projections carried by said sprocket chain to engage with one of the wheel axles of said car, and means to be given a step-by-step movement as the conveyer is actuated to cause an operation of the parts connected with said sprocket chain to transmit a forward movement to the car as each plate is taken therefrom.

5. A feeder mechanism comprising a base member, a supporting frame mounted on said base member, a belt conveyer mounted on the supporting frame, a car adapted to receive and hold a plurality of plates, a track mounted on the base member, wheels connected with said car by which the car is mounted on said track, a magnet mounted on the supporting frame to be capable of reciprocatory movement, sprocket wheels carried by the base member, a sprocket chain connected over said sprocket wheels, a plurality of projections provided on said sprocket chain to engage with one of the axles of said car, means to transmit motion to said sprocket wheels intermittently, an operating shaft connected to be rotated as the conveyer is actuated, an eccentric mounted on said operating shaft and connected with the magnet to cause a reciprocation thereof, and a second eccentric mounted on the operating shaft to cause an actuation of the means by which movement is transmitted to the sprocket chains.

6. A feeder mechanism comprising a base member, a supporting frame mounted on said base member, a belt conveyer mounted on the supporting frame, a car adapted to receive and hold a plurality of plates, a track mounted on the base member, wheels connected with said car by which the car is mounted on said track, a magnet mounted on the supporting frame to be capable of reciprocatory movement, sprocket wheels carried by the base member, a sprocket chain connected over said sprocket wheels, a plurality of projections provided on said sprocket chain to engage with one of the axles of said car, means to transmit motion to said sprocket wheels intermittently, an operating shaft connected to be rotated as the conveyer is actuated, an eccentric mounted on said operating shaft and connected with the magnet to cause a reciprocation thereof, a second eccentric mounted on the operating shaft to cause an actuation of the means by which movement is transmitted to the sprocket chain, and means by which said sprocket wheels may be moved to a point that the projections carried on the sprocket chains are spaced from the axles of the car.

7. A plate handling machine comprising means for supporting a stack of plates each standing on one of its edges, and coöperative means for first moving one of said plates laterally of all its edges and then turning it and conveying it along the plane of all its edges.

8. A plate handling machine comprising a plate-carrier, and mutually coöperative means for first moving the carrier a step and then pulling a plate from the carrier and moving the plate laterally of all its edges and then turning the plate and moving it along the plane of all its edges.

9. A plate handling machine comprising in mutually coöperative relation, a puller, primary means for moving a plurality of plates laterally of all their edges into range of said puller, secondary means for causing the puller to pull the plates one-by-one from said plurality, and means for adjusting the machine to vary the rate of movement of said primary means relative to said secondary means.

In testimony whereof we affix our signatures in presence of two witnesses.

THOMAS B. HUGHES.
WILLIAM J. DAVIS.
DAVID D. HUGHES.

Witnesses:
 Geo. Furnish,
 Cornelius Wetzel.